United States Patent [19]

Coats

[11] Patent Number: 5,755,163
[45] Date of Patent: May 26, 1998

[54] CARGO SUPPORT UNIT

[76] Inventor: Gary C. Coats, 1027 Kelly Creek Cir., Oviedo, Fla. 32765

[21] Appl. No.: 755,458

[22] Filed: Nov. 22, 1996

Related U.S. Application Data

[60] Provisional application No. 60/022,252, Ju. 22, 1996.

[51] Int. Cl.⁶ ............................................. B65D 19/38
[52] U.S. Cl. ................................. 108/53.5; 244/118.1
[58] Field of Search ................................. 108/150, 116, 108/135, 49, 53.5; 244/118.1

[56] References Cited

U.S. PATENT DOCUMENTS

| | | | |
|---|---|---|---|
| 781,328 | 1/1905 | Brown | 108/49 |
| 2,498,414 | 2/1950 | Gondar | 108/53.5 |
| 3,302,815 | 2/1967 | Morrison | |
| 3,936,109 | 2/1976 | Richardson | 108/150 |
| 4,046,277 | 9/1977 | Morrison | |
| 4,165,806 | 8/1979 | Cayton | |
| 4,272,933 | 6/1981 | Lopes | |
| 4,305,505 | 12/1981 | Hickey | |
| 4,875,645 | 10/1989 | Courter | |
| 5,269,645 | 12/1993 | Winski | |
| 5,299,691 | 4/1994 | Winski | |

*Primary Examiner*—Peter M. Cuomo
*Assistant Examiner*—Gerald A. Anderson
*Attorney, Agent, or Firm*—Herbert L. Lerner; Laurence A. Greenberg

[57] ABSTRACT

An aircraft cargo support unit to be attached to an aircraft pallet for shipment in an aircraft cargo bay, the unit includes a cargo support member dimensioned to fit within an aircraft cargo bay. A plurality of legs each having a top member, a middle member and a bottom member. There are hinges each connecting the cargo support member to a respective one of the legs for swinging the cargo support member to a vertical position parallel to the legs. The above mentioned middle members are movable along vertical axes for adjusting the height of the legs. The above mentioned bottom members each having a respective locking device for locking a respective one of the legs to an aircraft pallet. In addition, there is a second embodiment of the cargo support member that has a height adjustable top plate for supporting cargo. The second embodiment resides within the body of a standardized pallet, such as the pallets used in the trucking industry. The second embodiment is used to provide support to cargo on the upper levels of the pallet.

7 Claims, 5 Drawing Sheets

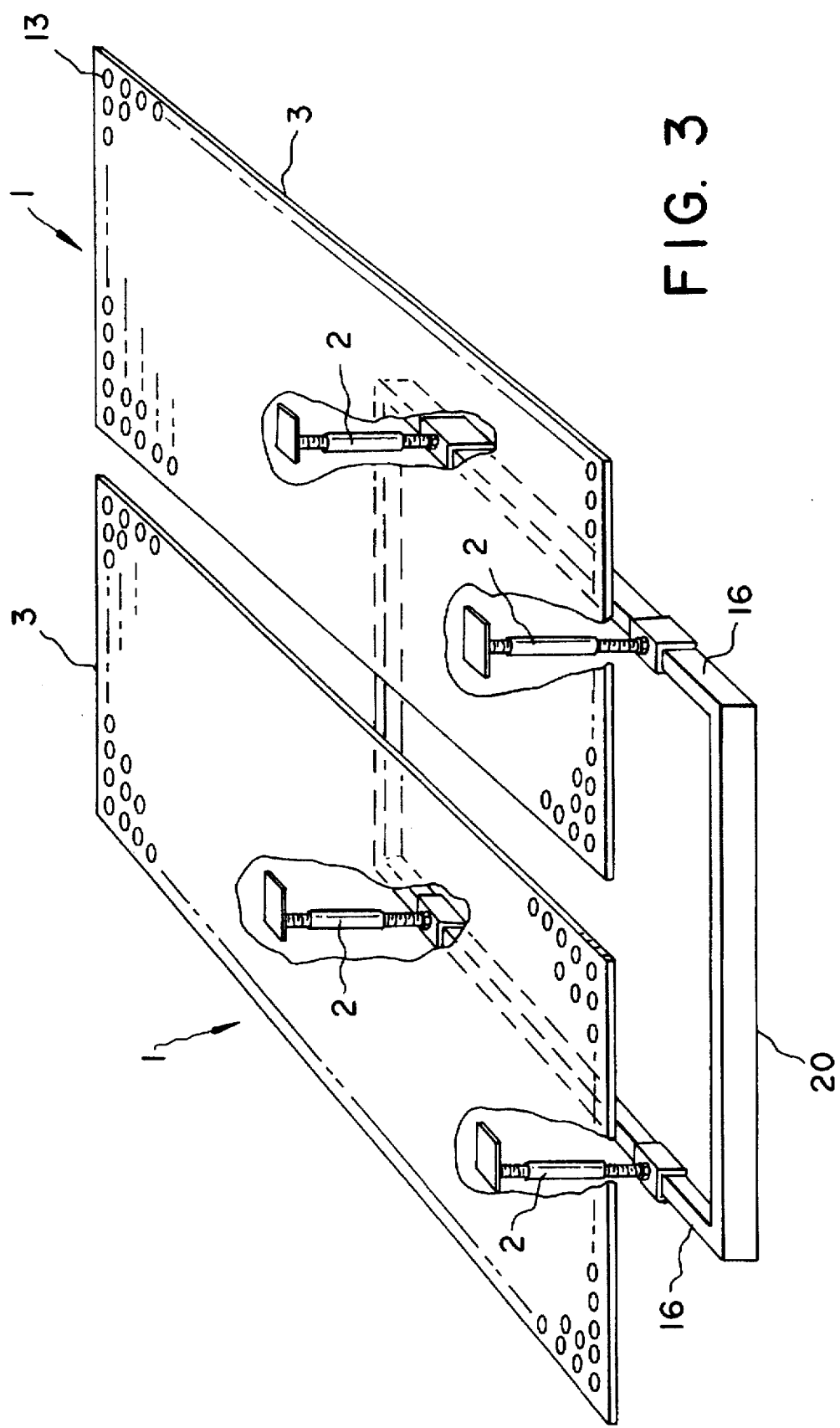

CARGO SUPPORT UNIT

CROSS REFERENCE

This application is based on Provisional application Ser. No. 60/022,252, filed Jul. 22, 1996.

BACKGROUND OF THE INVENTION

1. Field of the Invention

The invention relates to cargo support assemblies, utilized in conjunction with cargo pallets, to be placed in the cargo bays of commercial aircraft, trucks and other vehicles of transportation.

2. Description of the Related Art

The aircraft cargo industry is quite sizable with many daily national and international flights. In the interest of economy, much of the cargo is shipped in non-reusable boxes that are rather inexpensively made. The cardboard boxes are stacked on pallets to be rolled into the aircraft cargo bays. The circular fuselage of the cargo bay limits the pallet size to the dimensions of the floor of the cargo bay. For instant, a Boeing 767 has a cargo bay floor 62 inches wide. Two 30 inch wide pallets carrying 30 inch wide boxes are loaded, side-by-side, on the cargo bay floor. To utilize the wider storage capacity in the mid section of the cargo bay circumference, more boxes are stacked on the upper levels of the pallet. The boxes on the upper level hang over the pallet support structure and have a tendency to droop due to the weight of the goods in the boxes and the inexpensive construction of the boxes. Drooping boxes carrying fragile goods, such as cut flowers, can damage the goods that are carried inside. In addition, the weight of the upper boxes, can damage the goods contained in the lower stacked boxes.

U.S. Pat. No. 4,165,806 to Cayton teaches a pallet configured to alleviate the problem of the upper stacked boxes from crushing the lower stacked boxes. The pallets taught in Cayton are square or rectangular in shape and have intermediate support structures to support the weight of the upper boxes. However, the pallet taught in Cayton is not adjustable beyond the pallet dimensions and does not address damage to boxes that over hang the dimensions of the pallet. In addition, Cayton does not teach a vertically adjustable pallet support system.

The trucking industry is another sizable market that uses standardized pallets in the transportation of cargo. The standard truck bed, being rectangular in shape and 110 inches in height, has its own unique requirements. As pallet loads can vary in height and weight, there is a need to support the boxes in the top level of the pallet in addition to the stacking of pallets. The chief requirements for a cargo support device being the ability to adapt to various heights of cargo, ease of use, and an inexpensive device.

U.S. Pat. No. 4,305,505 to Hickey teaches a pallet securing kit constructed to secure cargo to the pallet to allow easier movement of the pallet without disturbing the cargo. However, that invention does not address an adjustable device to support cargo on the upper levels of the pallet and to protect the lower level cargo from the weight of the upper level cargo.

SUMMARY OF THE INVENTION

It is accordingly an object of the invention to provide a cargo support unit, which overcomes the herein-mentioned disadvantages of the heretofore-known devices and methods of this general type, and which provides a support mechanism to help maintain boxes in their original shape and to provide a height adjustable cargo support unit.

With the foregoing and other objects in view there is provided, in accordance with the invention, an aircraft cargo support unit to be attached to an aircraft pallet for shipment in an aircraft cargo bay, the unit comprising a cargo support member dimensioned to fit within an aircraft cargo bay; a plurality of legs each having a top member, a middle member and a bottom member; hinges each connecting the cargo support member to the top member of a respective one of the legs for permitting movement of the cargo support member to a vertical position parallel to the legs to allow easy storage, movement and setup of the cargo support member; the middle members adjusting the height of the legs along vertical axes; and the bottom members each having a respective locking device for locking a respective one of the legs to an aircraft pallet.

In the invention of the instant application, there is provided a cargo support unit constructed for an aircraft cargo bay where a support member extends into the widened portion of the aircraft fuselage and provides support to cargo stacked onto the support member. The cargo support member is easily attached to an aircraft cargo pallet and rolled into the aircraft cargo bay. In addition to providing support for the upper level cargo, the support member assists in loading additional cargo into the cargo bay by providing the extended support member. The cargo support member can be dimensioned to fit the dimensions of various aircraft fuselages.

In accordance with an added feature of the invention, the locking device is a track clip.

In accordance with an additional feature of the invention, the cargo support member has a plurality of holes formed therein for decreasing the weight of the cargo support member.

In accordance with another feature of the invention, the middle member is a turnbuckle, and the top member and the bottom member each have a threaded end for engaging the turnbuckle.

In accordance with an added feature of the invention, the middle member is a telescoping member.

In accordance with an additional feature of the invention, the middle member has an adjustment hole formed therein for receiving a turning tool to assist in rotation of the middle member.

In accordance with a concomitant feature of the invention, the cargo support member and the legs are each made from a material selected from the group consisting of aluminum, stainless steel, plastics, composites and other metals.

With the foregoing and other objects in view there is provided, in accordance with the invention, a cargo support unit, comprising a bottom plate having a sleeve receiving member formed thereon; a sleeve having a top end and a bottom end, the bottom end being coupled to the sleeve receiving member; and a top plate having a sleeve locking member, the sleeve locking member engaging the top end of the sleeve and the sleeve locking member being movable along a vertical axis of the sleeve for adjusting a height of the top plate.

In the invention of the instant application, there is provided a second embodiment of the cargo support unit constructed to be compatible with a standard cargo pallet. The unique features of this cargo support unit are that it is light weight, its height is adjustable, it is easy to use, it is inexpensive, and that it fits easily within the confines of the standardized pallet structure. The cargo support unit has a top plate which can be moved vertically up or down. The height is adjusted in relationship to the type of cargo. In

3 addition, the top plate can be fully extended to support the weight of another pallet and therefore protect the cargo on the lower pallet from the weight of the upper pallet.

In accordance with an added feature of the invention, the sleeve has a plurality of guide pin holes formed therein for receiving a guide pin; and the sleeve locking member and the sleeve receiving member each have a guide pin hole formed therein for receiving a guide pin and each is locked to the sleeve member via the sleeve guide pin holes.

In accordance with an additional feature of the invention, the top plate is dimensioned to support cargo or another standardized cargo pallet.

In accordance with another feature of the invention, the bottom plate is dimensioned to fit inside the standardized cargo pallet.

In accordance with an added feature of the invention, the sleeve is a square tube.

In accordance with an addition feature of the invention, the sleeve receiving member is seal welded to the bottom plate.

In accordance with another feature of the invention, the sleeve locking member is seal welded to the top plate.

In accordance with a concomitant feature of the invention, the bottom plate, the sleeve and the top plate each are made from a material selected from the group consisting of aluminum, stainless steel, plastics, wood, composites and other metals.

Other characteristic features of the invention are set forth in the appended claims.

Although the invention is illustrated and described herein as embodied in a cargo support unit, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 3 is a partly broken-away perspective view of two aircraft cargo port assemblies attached to a pallet;

4

Figure 8:
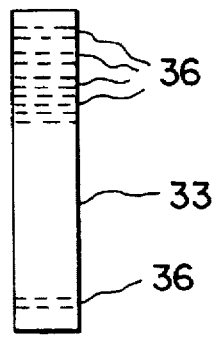
Figure 9:
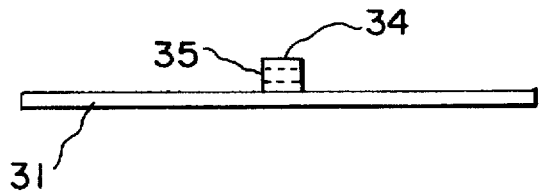

FIG. 8 is a side-elevation view of a sleeve of the standardized cargo support unit;

FIG. 9 is a side-elevation view of the bottom plate; and

Figure 10:
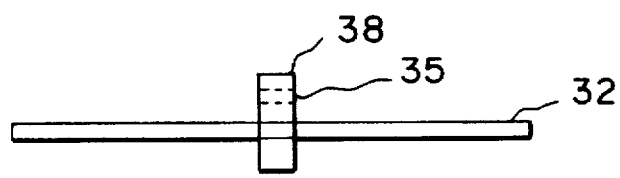

FIG. 10 is a side-elevation view of the top plate.

DESCRIPTION OF THE PREFERRED EMBODIMENTS

Figure 1:
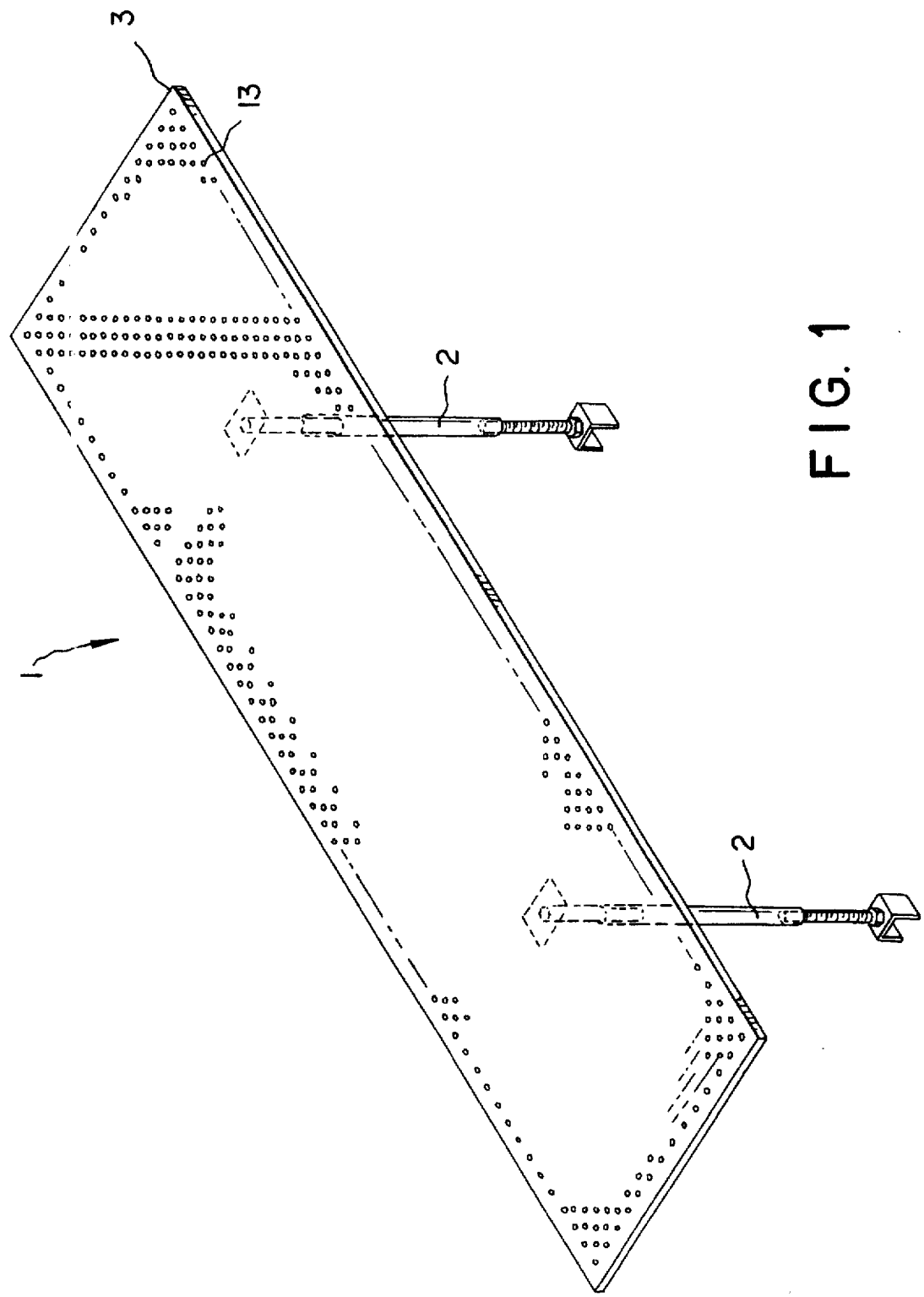
FIG. 1 is a diagramatic, perspective view of an aircraft cargo support unit according to the invention.

Referring now to the figures of the drawings in detail and first, particularly, to FIG. 1 thereof, there is shown an aircraft cargo support unit 1. The aircraft cargo support unit 1 has a plurality of adjustable legs 2 and a cargo support member 3. The aircraft cargo support unit 1 can be made from aluminum, wood, plastics, ceramics, composites, metals and other suitable materials. The cargo support member 3 can be made with a plurality of holes 13 in order to reduce the weight of the cargo support member 3.

Figure 2:
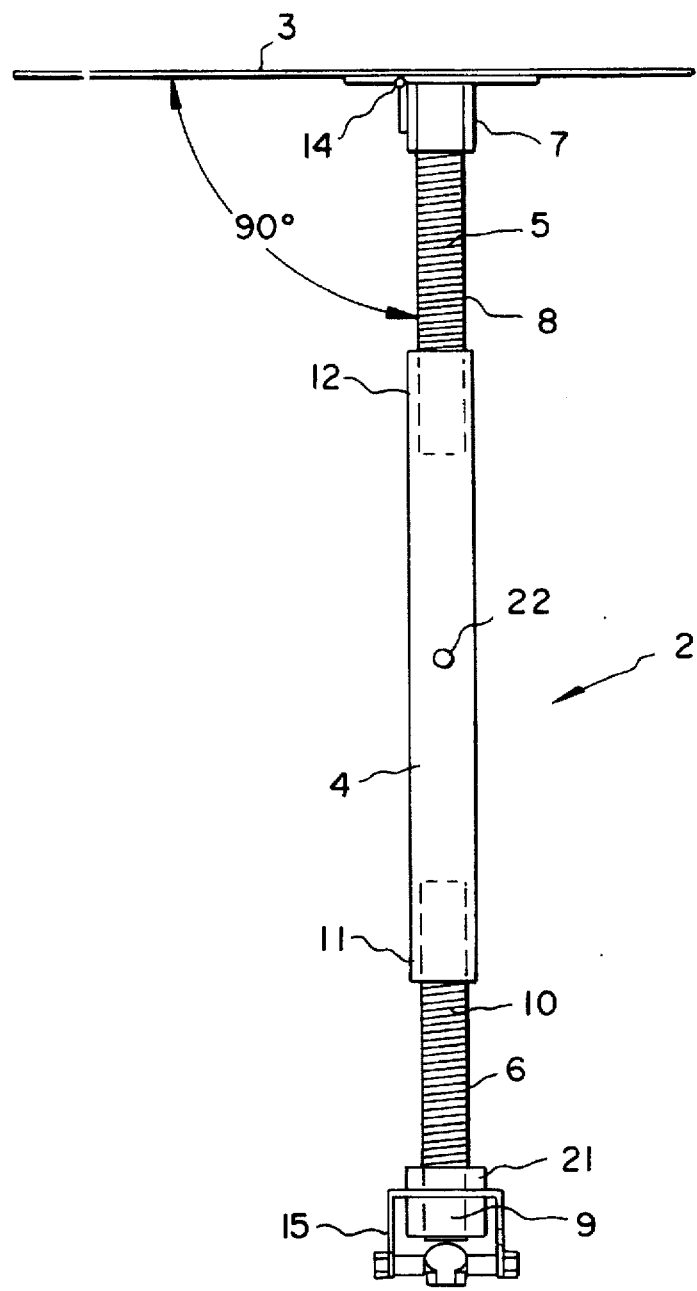
FIG. 2 is a side-elevation view of an adjustable leg supporting a cargo support member of the aircraft cargo support unit.

FIG. 2 shows the adjustable leg 2 having a middle member 4, a top member 5 and a bottom member 6. The top member 5 has a first end 7 and a threaded second end 8. The bottom member 6 has a first end 9 and a threaded second end 10. The middle member 4 can be a turnbuckle that has an internally threaded first end 11 and an internally threaded second end 12. The top end 8 of the top member 5 threads into the second end 12 of the middle member 4. The second end 10 of the bottom member 6 threads into the first end 11 of the middle member 4. The threads of the second end 8 of the top member 5 are opposite hand of the threads of the second end 10 of the bottom member 6. Height adjustments of the cargo support member 3 may be readily brought about by rotation of the middle member 4 of the leg 2. The middle member 4 has an adjustment hole 22. A turning tool such as a crow bar or rod can be inserted into the adjustment hole 22 for facilitating the rotation of the middle member 4. The invention uses a turnbuckle 4 to provide height adjustment means but numerous height adjustment devices could be substituted for the turnbuckle configuration such as a telescoping middle member. The bottom member 6 also has a lock nut 21 for preventing further movement of the turnbuckle 4.

Figure 2A:
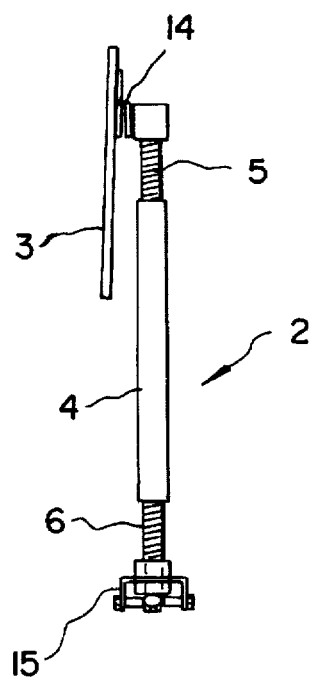
FIG. 2a is a side-elevation view of the adjustable leg with the cargo support member moved to a vertical position.

The first end 7 of the top member 5 of the leg 2 is hinged to the cargo support member 3 via a swing hinge 14. As shown in FIG. 2a, the cargo support member 3 can be moved to a vertical position in parallel with the legs 2 via the hinge 14 to facilitate the movement, storage, and setup of the aircraft cargo support unit.

The legs 2 attach and lock with a support member of an aircraft pallet via a locking device 15, such as a track clip, that can be swiveled and locked into position. The track clip 15 locks with a support member 16 of the aircraft pallet 20 as shown in FIG. 3. Various locking devices can be substituted for the track clip 15.

FIG. 3 shows two aircraft cargo support assemblies 1 locked to the pallet 20.

Figure 4:
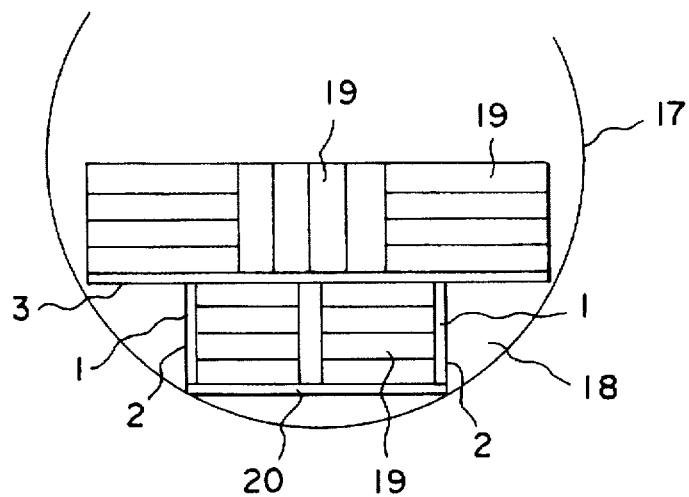
FIG. 4 is a vertical-sectional view of an aircraft cargo bay containing the pallet full of boxes utilizing the aircraft cargo support unit.

FIG. 4 shows an aircraft fuselage 17 and an aircraft cargo bay 18 containing two cargo support assemblies 1. The legs 2 of the cargo support assemblies 1 are secured to the pallet 20. Multiple boxes 19 are carried on the pallet 20. The cargo support members 3 prevent the ends of the elongated boxes 19 from drooping. Because there is no standard width for aircraft cargo bays, the width of the cargo support members 3 will have to be specially manufactured to accommodate the various dimensions of the different aircraft cargo bays.

The fact that the fuselage is approximately circular in cross section is important to the invention. Up to now the relatively narrow width of the cargo floor has determined the total width the boxes can occupy in a left-to-right or lateral sense, despite the fact that the fuselage becomes wider the farther above the cargo floor that the boxes are stacked. Should a cargo handler stack an upper layer of such boxes so as to occupy more of the space becoming available as a result of a wider part of the fuselage being reached, the unsupported ends of such boxes would droop in a severe manner. This drooping would cause damage to fragile cargo, such as cut flowers, carried in the upper layer of boxes. However, according to the invention, the cargo support members 3 prevent the boxes from drooping.

Figure 5:
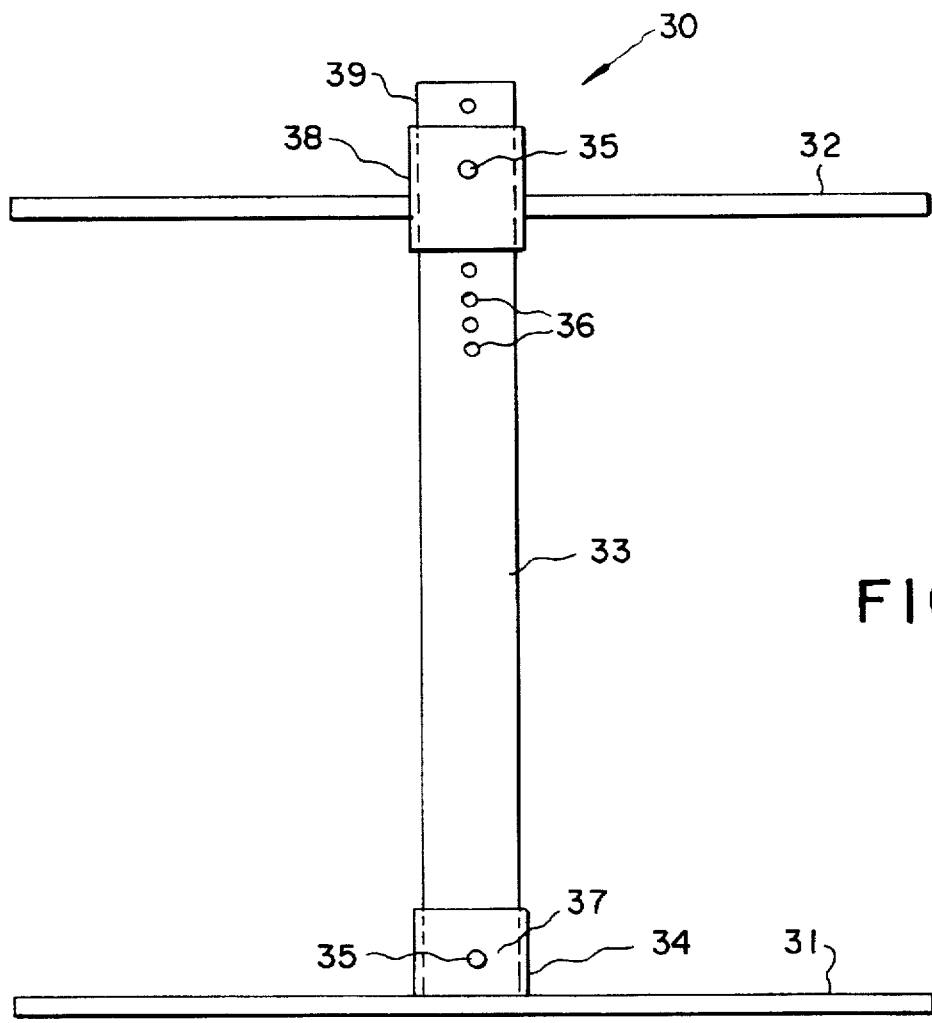
FIG. 5 is a front-elevational view of a standardized cargo support unit.

FIG. 5 shows a standardized cargo support unit 30. The cargo support unit 30 has a bottom plate 31, a top plate 32, and a sleeve 33. The bottom plate 31 has a centrally located sleeve receiving member 34. The sleeve receiving member 34 is seal welded to the bottom plate 31. The sleeve receiving member 34 has a guide pin hole 35 for receiving a non-illustrated guide pin. The sleeve 33 has a plurality of sleeve guide pin holes 36 for receiving the non-illustrated guide pin. The sleeve 33 has a bottom end 37, dimensioned to reside within the sleeve receiving member 34, and a top end 39. The bottom end 37 is locked to the sleeve receiving member 34 of the bottom plate 31 with a non-illustrated pin inserted in the pin guide holes 35 and 36. The sleeve 33 as illustrated is generally rectangular in shape and is constructed from square tubing.

The top plate 32 has a sleeve locking member 38 which is dimension to slide over the top end 39 of the sleeve 33. The sleeve locking member 38 has a guide pin hole 35. The top plate 32 can be moved up or down a vertical axis of the sleeve 33 and locked into place at one of the sleeve guide pin holes 36 with a non-illustrated pin. The sleeve locking member 38 is seal welded to the top plate 32.

The bottom plate 31 is fitted in the center of a non-illustrated pallet. The top plate 32 is adjusted to fit the height of the cargo on the pallet in order to support the upper part of the pallet load. In the alternative, the top support plate 32 can be placed above the cargo and support another pallet, thereby protecting the cargo on the lower pallet.

Figure 6:
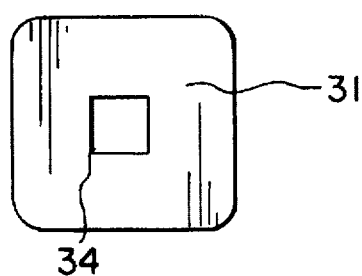
FIG. 6 is a top-plan view of a bottom plate of the standardized cargo support unit.

FIG. 6 shows another view of the bottom plate 31 and the sleeve receiving member 34.

Figure 7:
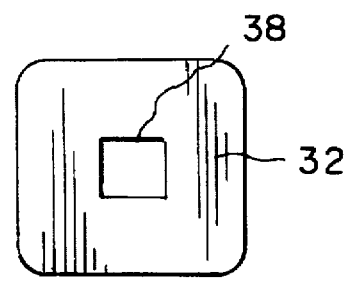
FIG. 7 is a top plan view of a top plate of the standardized cargo support unit.

FIG. 7 shows another view of the top plate 32 and the sleeve locking member 38.

FIG. 8 shows another view of the sleeve 33 and the various sleeve guide pin holes 36.

FIG. 9 shows a side view of the bottom plate 31, the sleeve receiving member 34 and the guide pin hole 35.

FIG. 10 shows a side view of the top plate 32, the sleeve locking member 38 and the guide pin hole 35.

The standardized cargo support unit 30 can be made from various materials including but not limited to aluminum, stainless steel, other metals, wood, plastics and composites.

I claim:

1. A combination of an aircraft cargo bay having a plurality of cargo pallets, an aircraft cargo support units comprising:

a cargo support member dimensioned to fit within an aircraft cargo bay;

a plurality of legs each having a top member, a middle member and a bottom member;

hinge means connecting said cargo support member to said top member of a respective one of said legs for permitting movement of said cargo support member to a vertical position parallel to said legs to allow easy storage, movement and for setup of said cargo support member;

said middle members adjusting the height of said legs along vertical axes; and said bottom members each having a respective locking device for locking a respective one of said legs to one of the cargo pallets.

2. The aircraft cargo support unit according to claim 1, wherein said locking device is a track clip.

3. The aircraft cargo support unit according to claim 1, wherein said cargo support member has a plurality of holes formed therein for decreasing the weight of said cargo support member.

4. The aircraft cargo support unit according to claim 1, wherein:

said middle member is a turnbuckle; and said top member and said bottom member each have a threaded end for engaging said turnbuckle.

5. The aircraft cargo support unit according to claim 1, wherein said middle member is a telescoping member.

6. The aircraft cargo support unit according to claim 4, wherein said middle member has an adjustment hole formed therein for receiving a turning tool to assist in rotation of said middle member.

7. The aircraft cargo support unit according to claim 1, wherein said cargo support member and said legs are each made from a material selected from the group consisting of aluminum, stainless steel, plastics, composites and other metals.

* * * * *

UNITED STATES PATENT AND TRADEMARK OFFICE
CERTIFICATE OF CORRECTION

PATENT NO. : 5,755,163
DATED      : May 26, 1998
INVENTOR(S): Gary Coats

It is certified that error appears in the above-identified patent and that said Letters Patent is hereby corrected as shown below:

TITLE PAGE:
Item [76] should read as follows:

Gary C. Coats. 1040 Covington Street, Oviedo, Fla. 32765

Signed and Sealed this

Nineteenth Day of January, 1999

Attest:

Attesting Officer

*Acting Commissioner of Patents and Trademarks*